United States Patent
Jain et al.

(10) Patent No.: US 8,238,187 B2
(45) Date of Patent: Aug. 7, 2012

(54) FAST CYCLIC DECODER CIRCUIT FOR FIFO/LIFO DATA BUFFER

(75) Inventors: Animesh Jain, Karnataka (IN);
Nagendra Chandrakar, Karnataka (IN);
Sonia Ghosh, Karnataka (IN)

(73) Assignee: Advanced Micro Devices, Inc., Sunnyvale, CA (US)

( * ) Notice: Subject to any disclaimer, the term of this patent is extended or adjusted under 35 U.S.C. 154(b) by 150 days.

(21) Appl. No.: 12/847,473

(22) Filed: Jul. 30, 2010

(65) Prior Publication Data

US 2012/0026819 A1    Feb. 2, 2012

(51) Int. Cl.
*G11C 7/00* (2006.01)

(52) U.S. Cl. ............... 365/221; 365/189.05; 365/230.08

(58) Field of Classification Search ............ 365/221, 365/189.05, 230.08
See application file for complete search history.

(56) References Cited

U.S. PATENT DOCUMENTS

| | | | | |
|---|---|---|---|---|
| 5,550,782 A | * | 8/1996 | Cliff et al. | 365/230.03 |
| 5,610,872 A | * | 3/1997 | Toda | 365/230.06 |
| 6,856,558 B1 | * | 2/2005 | Proebsting et al. | 365/193 |

* cited by examiner

*Primary Examiner* — Son Dinh
(74) *Attorney, Agent, or Firm* — Hamilton & Terrile, LLP; Gary W. Hamilton

(57) ABSTRACT

Embodiments of systems and methods for improved first-in-first-out (FIFO), last-in-last out (LIFO) and full-cycle decoders are described herein. In the various embodiments of the system, a clock generator is operable to generate a clock signal having an active phase and an inactive phase. A set of monotonic flip-flops are operable to capture a set of incoming data addresses during the active cycle of the clock and to generate therefrom data corresponding to single bits in the addresses that have changed compared to the data addresses received by the set of monotonic flip-flops during an immediately preceding data capture cycle. A set of static flip-flops are operable to capture a set of incoming data addresses during the inactive phase of the clock cycle and to generate set output data therefrom. A decoder operable to process the set output data from the set of static flip-flops and to generate a set of old wordlines corresponding to a set of data addresses in the immediately preceding data capture cycle. Combinational is logic operable to receive the set of single changed bits and the set of old wordlines and to generate therefrom a set of new wordlines. Methods are also described herein for using the aforementioned system.

25 Claims, 9 Drawing Sheets

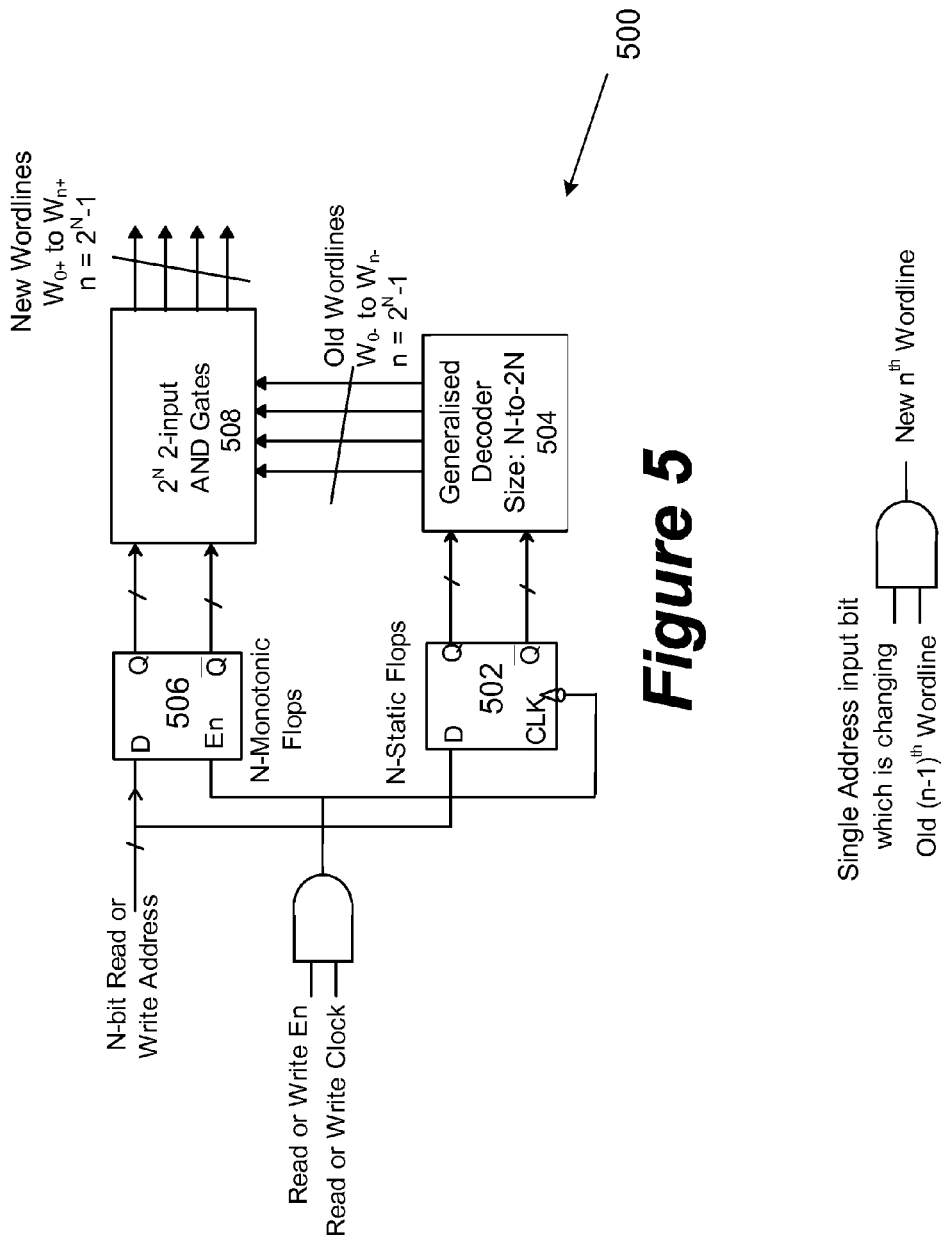

FAST CYCLIC DECODER CIRCUIT FOR FIFO/LIFO DATA BUFFER

BACKGROUND OF THE INVENTION

1. Field of the Invention

The present invention relates in general to the field of data processing circuitry and, more specifically, to systems and methods for providing an improved first-in-first-out (FIFO) and last-in last-out (LIFO) data buffer.

2. Description of the Related Art

A FIFO buffer is a common digital block used when data needs to be transferred between two blocks of a digital system. A typical FIFO has an array of memory in which data is stored. The memory is accessed using read and write pointers which define the location of memory that needs to be read-out or written-in. The read and write pointers need to be decoded to generate the wordlines to access the memory. A generalized decoder typically is used to decode the wordlines, thereby allowing decoding of the pointers in any order. The read and write pointers in a FIFO buffer follow a pattern; however, prior-art decoder circuits do not take advantage of this pattern to optimize decoding.

A LIFO buffer uses a single pointer for both read and write. On reset, the pointer is initialized to the first element and the LIFO is EMPTY. In a write operation, the pointer is first incremented and write occurs on the address indicated by the new incremented value of the pointer. If the pointer reaches the last element, the LIFO is FULL. In a read operation, the read occurs on the address indicated by current value of pointer and the pointer is then decremented. If the pointer reaches the first element, the LIFO is EMPTY again. From the decoder perspective a single decoder common to both read/write is used and the address which it receives for decoding depends on the read or write.

Most prior-art decoders use a generalized N to $2^N$ decoder, which can decode the pointers in any order. These decoders consist of a series of AND/NAND gates, with the number of gates being directly related to the number of bits to be decoded. The total delay of the wordline generation depends on the size of decoder, since the higher the number of bits to be decoded, higher the delay will be because of the larger number of AND/NAND gates need in the path used to the generate the wordline.

In view of the foregoing, it is apparent that there is a need for improved systems and methods for an optimized decoder that efficiently decodes addresses in a buffer to reduce the delay in the paths used to generate wordlines.

BRIEF DESCRIPTION OF THE DRAWINGS

The present invention may be understood, and its numerous objects, features and advantages obtained, when the following detailed description is considered in conjunction with the following drawings, in which:

FIG. 5 is a schematic illustration of logic components of a fast FIFO cyclic decoder in accordance with embodiments of the invention described herein;

FIG. 6 is a schematic illustration of a two-input AND circuit operable to receive an Old wordline and a single changed address input bit to generate a new wordline;

SUMMARY OF EMBODIMENTS OF THE INVENTION

Figure 1:
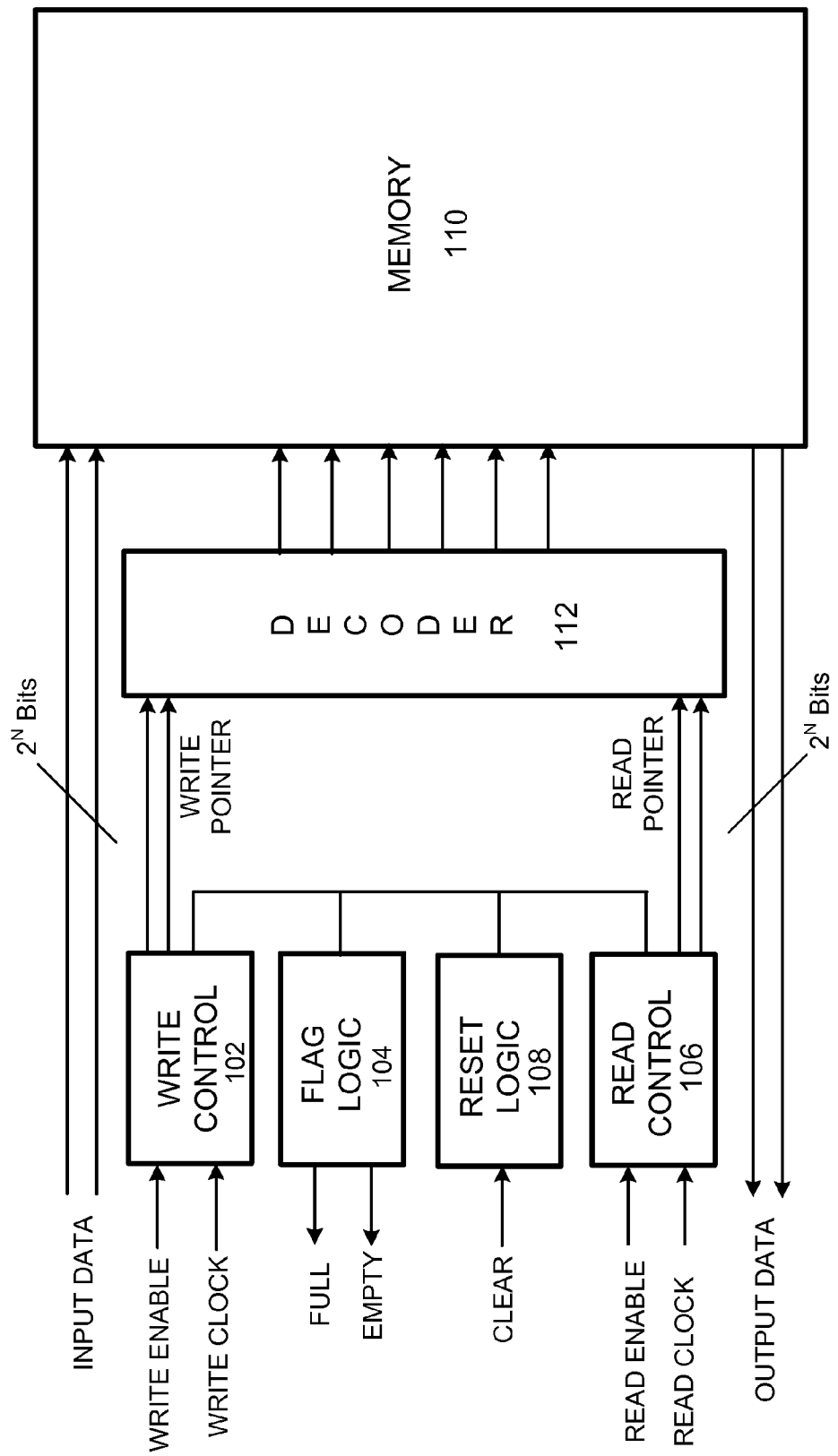
FIG. 1 is a schematic illustration of logic components of a prior-art First-In-First-Out (FIFO) data processing circuit.

Embodiments of the invention comprise systems and methods for improved first-in-first-out (FIFO), last-in-last out (LIFO) and full-cycle decoders. Various embodiments of the invention are described; however, the techniques described herein are also applicable to other forms of data processing circuits.

In one embodiment, the invention relates to a system for processing data in a buffer circuit. The system comprises: a clock generator operable to generate a clock signal having an active phase and an inactive phase; a set of monotonic flip-flops operable to capture a set of incoming data addresses during said active cycle of said clock and to generate therefrom data corresponding to single bits in said addresses that have changed compared to the data addresses received by said set of monotonic flip-flops during an immediately preceding data capture cycle; a set of static flip-flops operable to capture a set of incoming data addresses during said inactive phase of said clock cycle and to generate set output data therefrom; a decoder operable to process said set output data from said set of static flip-flops and to generate a set of old wordlines corresponding to a set of data addresses in said immediately preceding data capture cycle; and combinational logic operable to receive said set of single changed bits and said set of old wordlines and to generate therefrom a set of new wordlines.

In another embodiment, the invention relates to a method for processing data in a buffer circuit. The method comprises: using a clock generator to generate a clock signal having an active phase and an inactive phase; using a set of monotonic flip-flops to capture a set of incoming data addresses during said active cycle of said clock and to generate therefrom data corresponding to single bits in said addresses that have changed compared to the data addresses received by said set of monotonic flip-flops during an immediately preceding data capture cycle; using a set of static flip-flops to capture a set of incoming data addresses during said inactive phase of said clock cycle and to generate set output data therefrom; using a decoder to process said set output data from said set of static flip-flops and to generate a set of old wordlines corresponding to a set of data addresses in said immediately preceding data capture cycle; and using combinational logic to receive said set of single changed bits and said set of old wordlines and to generate therefrom a set of new wordlines. In some embodiments of the system and method disclosed herein, the buffer comprises a first-in-first-out (FIFO) buffer. In some embodiments, the buffer comprises a last-in-first-out (LIFO) buffer. In other embodiments, the buffer comprises a full-cycle decoder. In additional embodiments the combinational logic comprises a plurality of two-input NAND circuits. In some embodiments, the incoming data addresses are coded using Gray coding.

DETAILED DESCRIPTION

Embodiments of circuitry are described for systems and methods for providing optimized decoder that efficiently decodes addresses in a FIFO buffer, a LIFO buffer, or a full-cycle buffer to reduce the delay in the paths used to generate wordlines. Illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are depicted with reference to simplified drawings in order to avoid limiting or obscuring the present invention. Such descriptions and representations are used by those skilled in the art to describe and convey the substance of their work to others skilled in the art. Various illustrative embodiments of the present invention will now be described in detail with reference to the Figures.

FIG. 1 is a generalized block diagram of a typical prior-art FIFO 100. The circuit shown in FIG. 1 requires a free-running clock from the writing system and another from the reading system. Writing is controlled by the WRITE ENABLE input provided to the write control module 102 synchronously with WRITE CLOCK. The FULL status, generated by flag logic module 104, indicates that the memory 110 is full; hence no further data can be written into the FIFO. In an analogous manner, data words are read out based on the READ ENABLE input signal provided to the read control module 106 synchronously with READ CLOCK. The EMPTY status, generated by flag logic module 104, indicates that the memory 110 is empty; hence no further data can be readout from the FIFO 100.

In a circular FIFO configuration, the memory address of the incoming data is in the write pointer. The address of the first data word in the FIFO that is to be read out is in the read pointer. After reset, by the reset logic module 108, both pointers indicate the same memory location. After each write operation, the write pointer is set to the next memory location. The reading of a data word sets the read pointer to the next data word that is to be read out. The read pointer constantly follows the write pointer. When the read pointer reaches the write pointer, the FIFO is empty. Likewise, if the write pointer catches up with the read pointer, the FIFO is full.

In a hardware implementation of circular memory, a memory element such as dual-port SRAM or a register file is used for data storage. The pointers take the form of binary counters, which generate the memory addresses of the SRAM. The read or write pointers all move in the forward direction incrementing based on READ/WRITE ENABLE.

Figure 2:
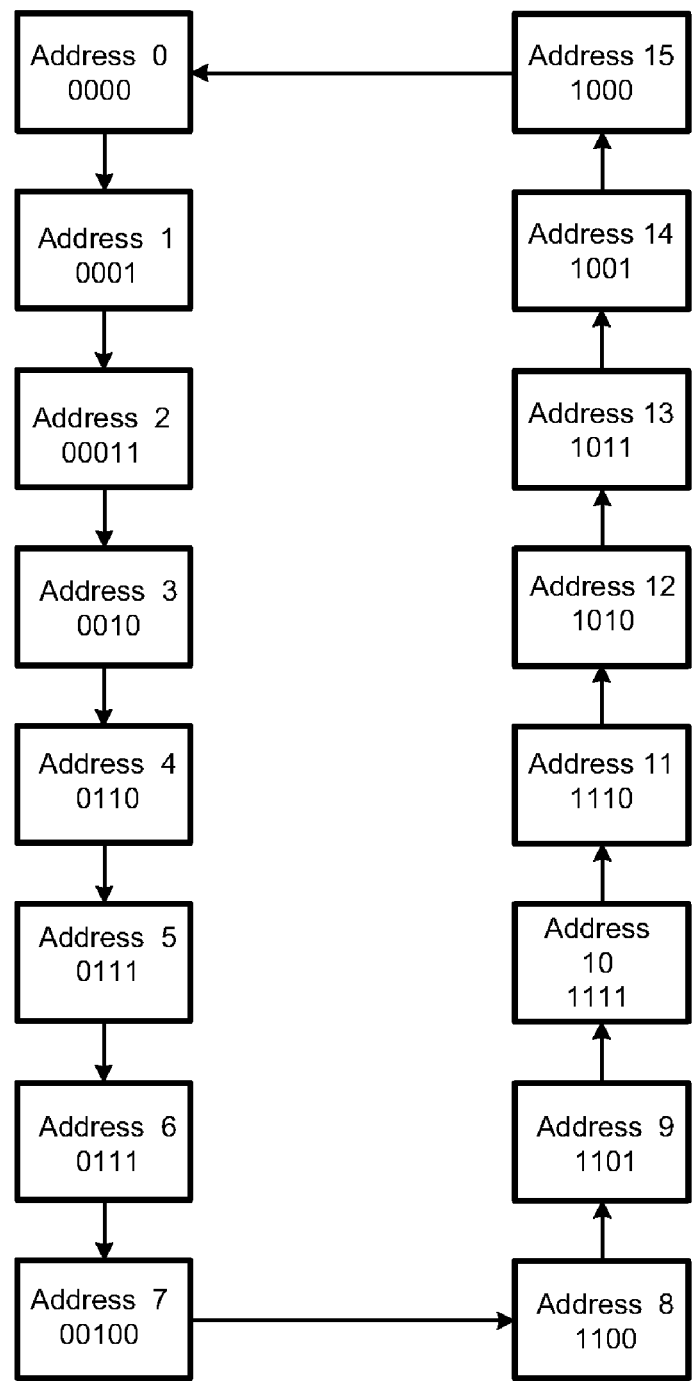
FIG. 2 is an illustration of the transition of 4-bit width Read or Write pointers using Gray coding.

In generally Gray coding is used in pointers because it can save power, since only one bit change occurs in each address change. FIG. 2 shows the cyclic change of Read or Write pointers of width 4-bit movement using Gray Coding. In the subsequent discussion herein, the terms "pointer" and "address" are used interchangeably.

Figure 3:
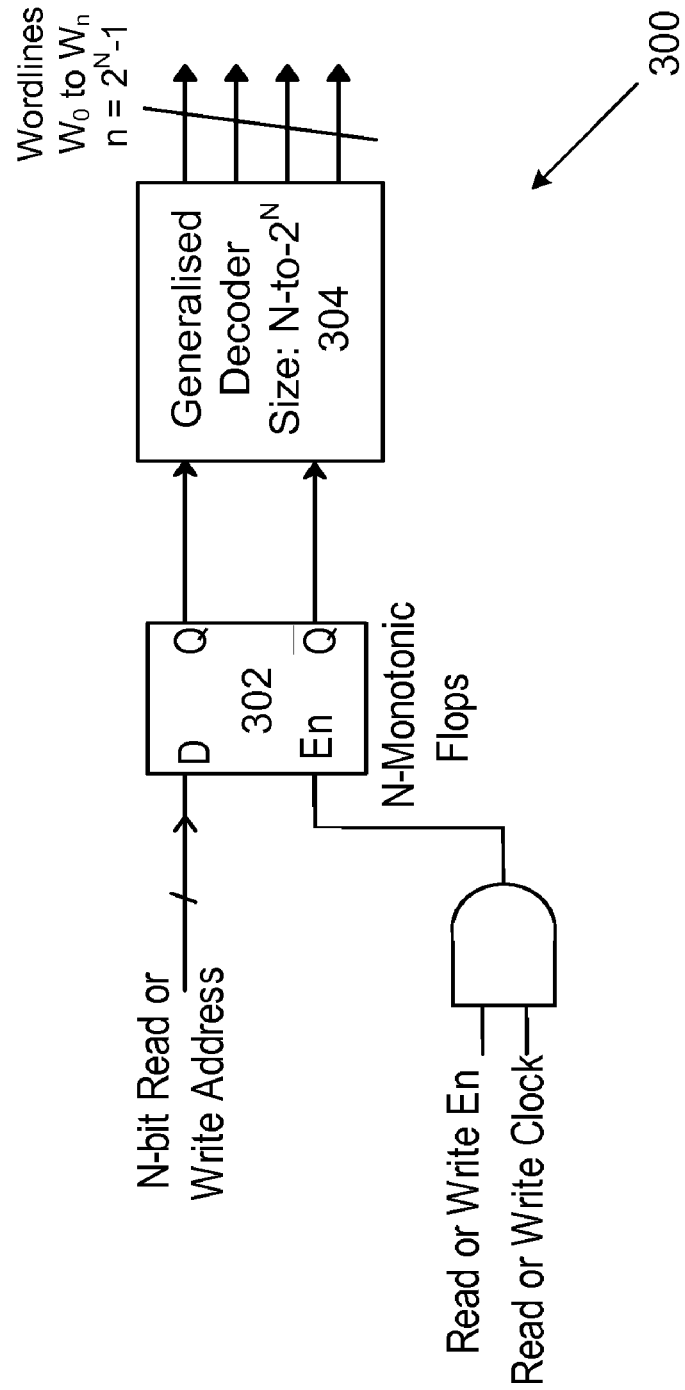
FIG. 3 is an illustration of a prior-art generalized FIFO decoder that allows decoding of pointers in any order.

The memory shown in FIG. 1 is an array of memory elements divided into row and columns. One row or column can form a word which needs to be accessed by the location defined by READ/WRITE pointers. In order to select the particular word, the read/write pointers need to be decoded to generate the wordline which selects the word to be read or written. FIG. 3 is a block diagram of a typical prior-art decoder 300, corresponding to decoder 112 in FIG. 1, in which Read/Write Enable and Clock addresses are captured by a set of monotonic flip-flops 302, followed by a generalized decoder 304 comprising a chain of AND/NAND gates that generate $2^N$ wordlines based on N-bit input addresses. A monotonic flip-flop is a latch followed by a gater. It will reset the output value $Q/\overline{Q}$ when the clock is inactive and passes the captured input values to $Q/\overline{Q}$ during the active phase of the clock. In the configuration shown in FIG. 3, it is assumed that the READ or WRITE operation occurs during active phase of the clock. It is also assumed that the input address is available before the active phase of the clock begins and that the operation needs to be completed during the active phase of the clock, i.e. operation is limited to half the cycle.

The decoder shown in FIG. 3 is referred as generalized decoder, since it allows decoding of the pointers in any order. The total delay of the wordline generation depends on the size of the decoder, since the higher the number of bits to be decoded, the higher the delay will be due to a higher number of AND/NAND gates in the path to the generate the wordline.

Figure 4:
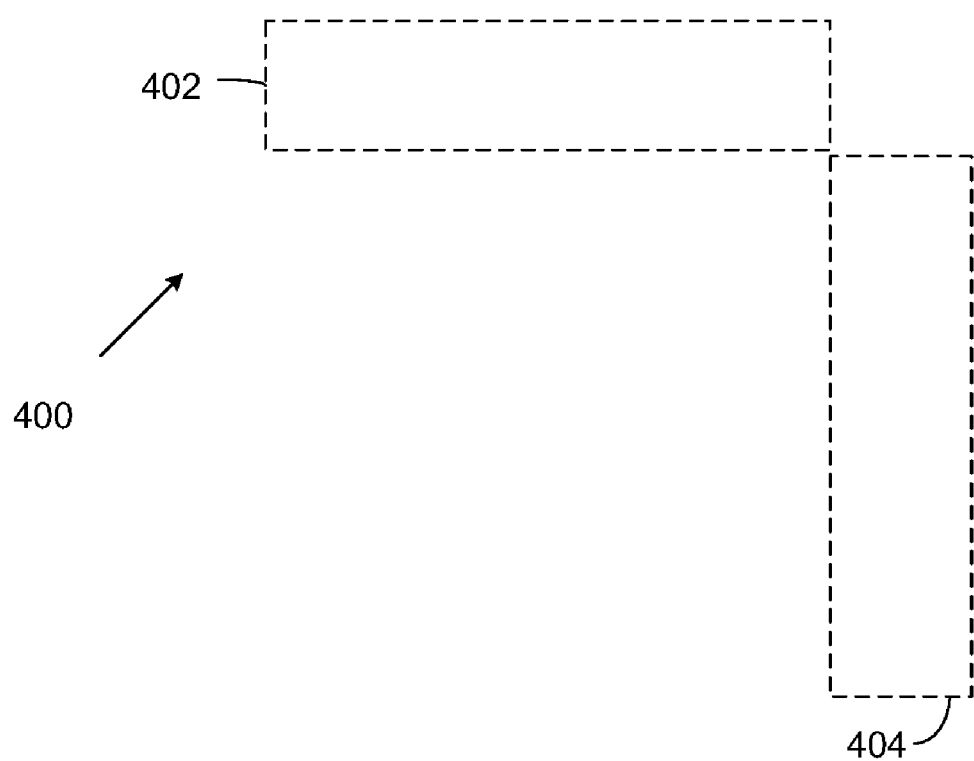
FIG. 4 is a schematic illustration of the functional components of a prior-art 4×16 FIFO decoder that receives input data on 4-bit input lines and uses Gray coding to generate data on 16 wordlines.

FIG. 4 shows a 4×16 Gray input decoder 400 which takes a 4-bit input address A0 to A3 in Gary coding and generates the 16 wordlines W0 to W15 based on input address. In the embodiment shown FIG. 4, there are two sets of NAND gates 402 and 404 in the decoder. In higher order decoder such as 5×32 or 8×256 the number of AND/NAND gates between the input and output wordline will be higher, resulting in more delay.

Since the address in a FIFO moves in a particular order, not in a random fashion, an optimized fast decoder can be implemented. An embodiment of the improved decoder 500 of the present invention is shown in the FIG. 5. In this embodiment, a second set of B-phase static flip-flops 502 are added which captures the input address in the inactive phase of the clock and the decoding by generalized decoder 504 also occurs during the inactive phase of the clock, to generate old wordlines W0− to Wn−, where $n=2^N-1$ and the (−) minus sign represents that they are old wordlines. The set of monotonic flip-flops 506 captures the incoming address during the active phase of the clock. The decoder also contains set of $2^N$ two input AND gates 508 which combines old wordlines and new addresses to generate the new wordlines W0+ to Wn+ where $n=2^N-1$ and the (+) plus sign represents that they are new wordlines. Since only a two-input AND gate is present between the input address and output wordline, the delay of the decoder 500 is reduced to the delay of a single AND gate, which was dependent on number of bits to be decoded in prior-art decoders.

FIG. 6 is an illustration of the generation of new wordlines from the old wordlines. Since the input address due to Gray coding changes by only one-bit, that particular changing bit along with (n−1)th wordline is combined in the AND gates. Since there are $n=2^N$ wordlines, there will be $2^N$ two-input AND gates combining the old wordlines along with the new-address changing bit. The static flip-flops need to be initialized to $2^N$ address during reset.

Figure 7:
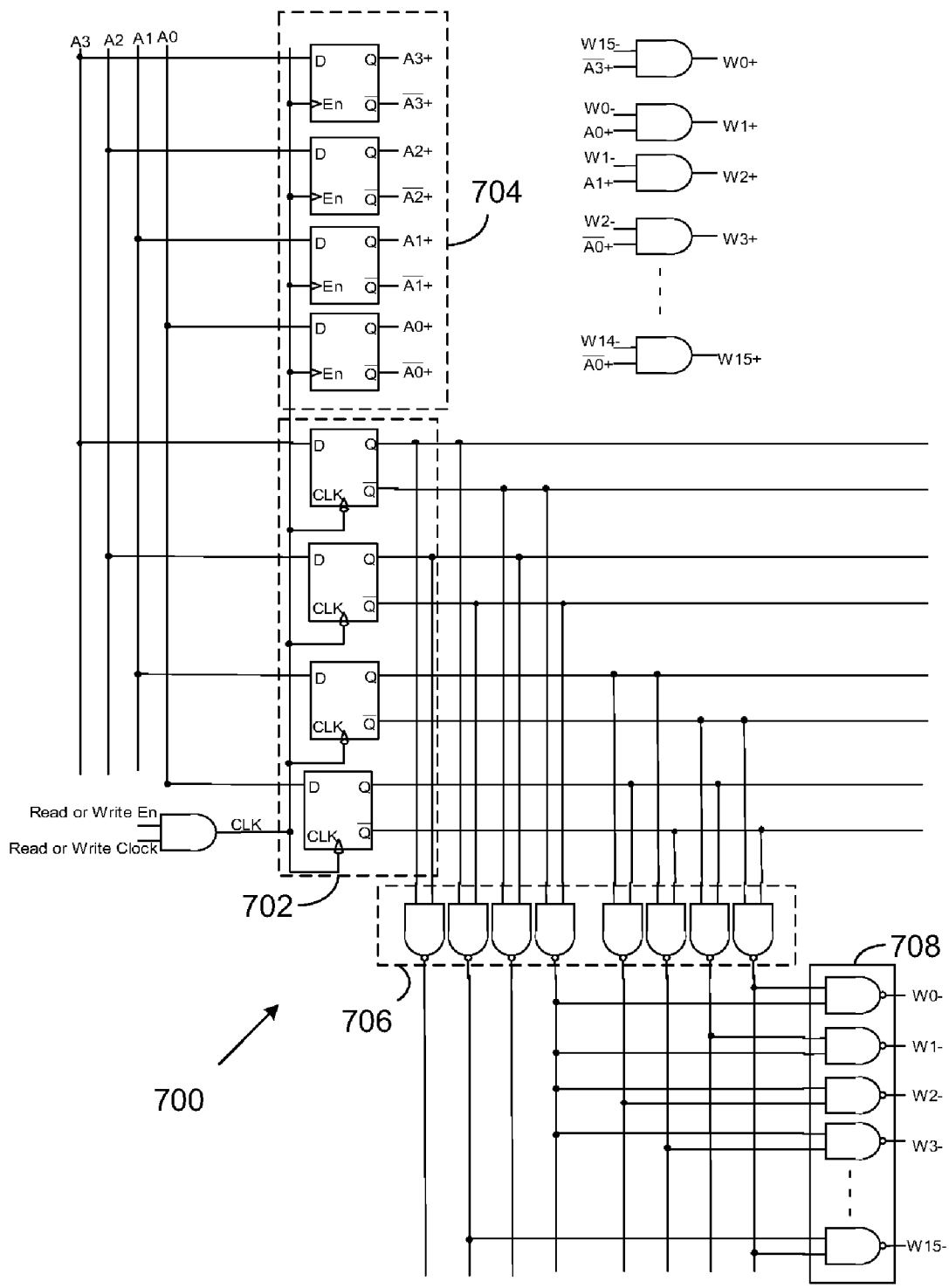
FIG. 7 is a schematic illustration of the functional components of an embodiment of the invention for implementation of a 4×16 FIFO decoder clock circuit.

FIG. 7 is a schematic block diagram of an embodiment of an implementation of a 4×16 decoder FIFO 700, based on the methodology described herein. The input address A0-A3 is captured in B-phase static flip-flops 702 flip-flop and decoded into W0− to W15−. When new addresses arrive, they are captured in the monotonic flip-flops 704 and then combined with old wordlines in NAND gates 706 and 708 to generate the new wordlines W0+ to W15+.

The methodology described herein can be easily extended to full-cycle decoder and also can be extended to LIFO buffer decoders where pointers increment/decrement in fixed order. It can also be extended for any type of methodology used for coding the pointers.

Figure 8:
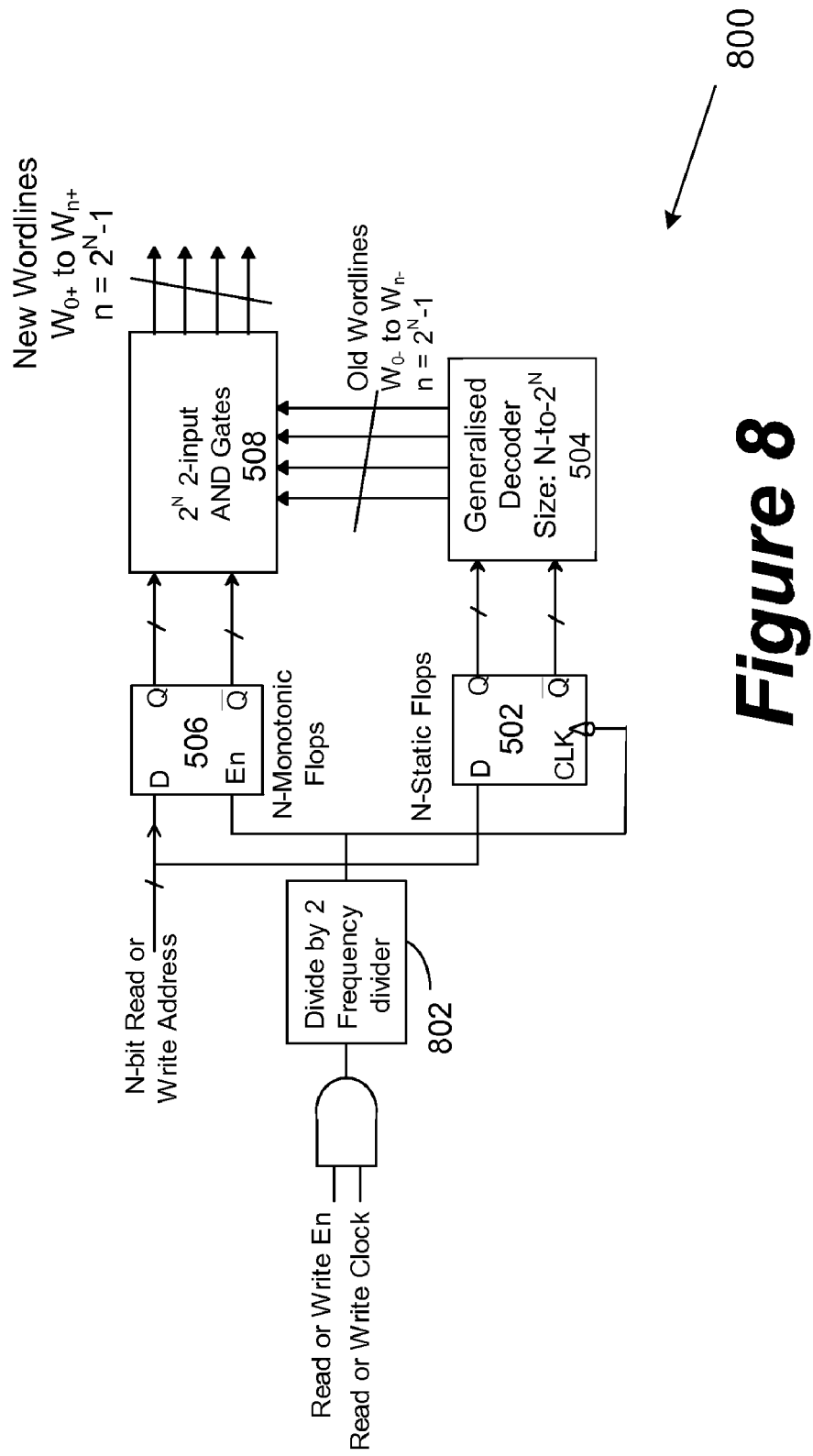
FIG. 8 is a schematic illustration of logic components for implementing a full-cycle decoder in accordance with an embodiment of the invention.

FIG. 8 is a schematic illustration of logic components for implementing a full-cycle decoder 800 in accordance with an embodiment of the invention. A full-cycle buffer decoder is required in the cases where the read/write operation is extended for the more than one cycle. The full-cycle decoder 800 comprises substantially similar components to the decoder 500 shown in FIG. 5, with the addition of a frequency divider 802 that is operational to divide the locally generated clock by a factor of two. The output of the divider 802 is provided as an input to the montotomic flip-flops 506 and the N-Static flip-flops 502.

Figure 9:
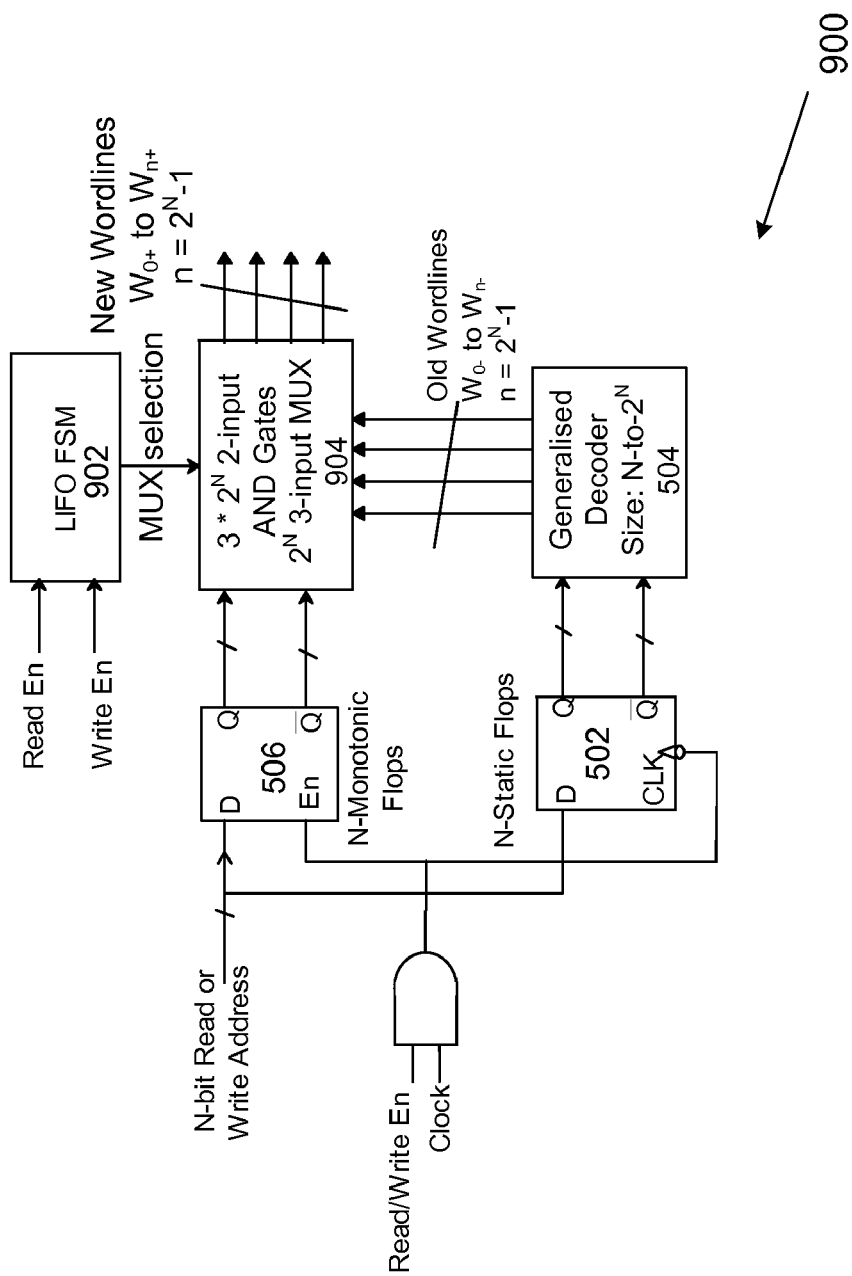
FIG. 9 is a schematic illustration of logic components of a fast LIFO cyclic decoder in accordance with embodiments of the invention described herein.

FIG. 9 is a schematic illustration of logic components of a fast LIFO cyclic decoder 900 in accordance with embodiments of the invention described herein. A LIFO buffer uses a single pointer for both read and write. On reset, the pointer is initialized to the first element and the LIFO is EMPTY. In a write operation, the pointer is first incremented and write occurs on the address indicated by the new incremented value of the pointer. If the pointer reaches the last element, the LIFO is FULL. In a read operation, the read occurs on the address indicated by current value of pointer and the pointer is then decremented. If the pointer reaches the first element, the LIFO is EMPTY again. From the decoder perspective a single decoder common to both read/write is used and the address which it receives for decoding depends on the read or write.

The decoder 900 as shown in FIG. 9 contains a set of B-phase static flip-flops 502 which capture the previous address irrespective of the read or write operation. The relation of the new address with respect to the old address for the decoding operation is not as straight forward as in case of a FIFO and, instead, is dependent on the previous Read or Write operation. The relationship is shown below in Table 1:

TABLE 1

| Operation history | New address in relation to old address |
| --- | --- |
| READ after READ | Decrement of the old address to obtain new address |
| READ after WRITE | New address is same as old address. |
| WRITE after READ | New address is same as old address. |
| WRITE after WRITE | Increment of the old address to obtain new address |

Since the address or pointer is encoded using Gray Coding, the increment or decrement is a one-bit change. Therefore, the old wordline can be combined with the changing bit by a AND gate to obtain the new wordline. If the address is remaining same, then any bit of the address can be used as an input to the AND gate. However, since the new address is dependent on the old address based on previous Read/Write operation, a three-input multiplexer 904 is also included in the decoder as shown in FIG. 10.

Figure 10:
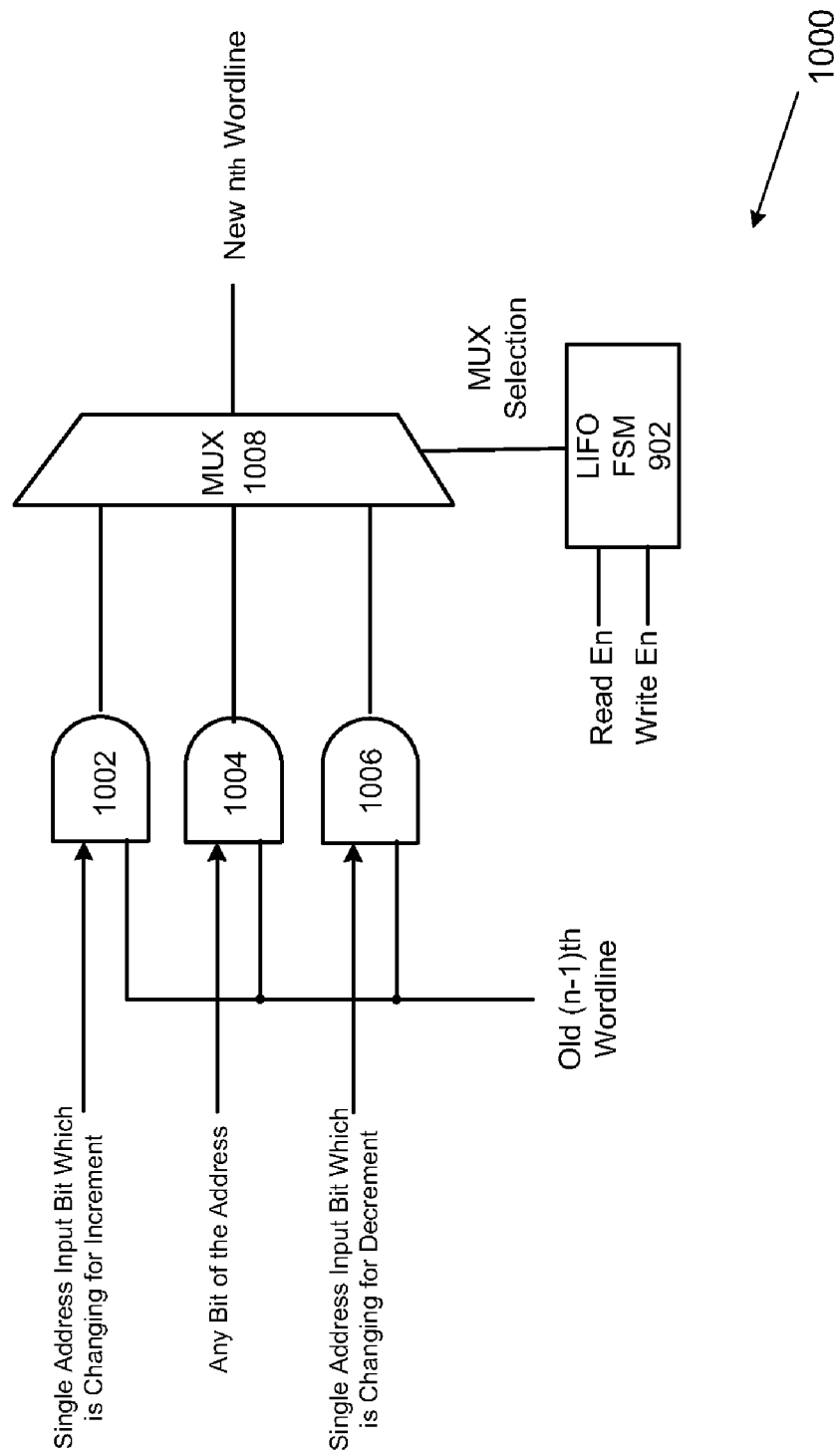
FIG. 10 is an illustration of LIFO cyclic decoder in accordance with embodiments of the invention described herein; and Where considered appropriate, reference numerals have been repeated among the drawings to represent corresponding or analogous elements.

FIG. 10 shows details of the logic module 904 shown in FIG. 9. A control signal to control operation of the multiplexer 1008 is generated by the LIFO FSM 902 (Finite state machine) which receives Read and Write enable signals and generates the selection signal based on "previous" wordline address history, using the state relationships shown above in Table 1. The three two-input AND gates 1002, 1004, and 1006, each receive data corresponding to the Old (n−1)th wordline on one of their respective input terminals. In addition, AND gate 1002 receives input data for a single input bit that is changing for a wordline address that is incrementing and AND gate 1006 receives input data for a single input bit of a wordline address that is decrementing. As shown above in Table 1, the new address of the wordline remains the same for a READ after WRITE or for a WRITE after READ. As discussed above, if the address is remaining same, any bit of the address can be used as an input to the AND gate 1004. The LIFO FSM is operable to control the multiplexer 1008 to select the data output of one of the AND gates 1002, 1004, 1006, in accordance with the address relationships shown in Table 1 to generate the new nth wordline. In the embodiment of the LIFO buffer decoder described herein, a total of $3*2^N$ two-input AND gates and $2^N$ three-input multiplexers are used to generate a complete set of new wordlines.

Embodiments of the invention can be fabricated using well know techniques that can implemented with a data processing system using code (e.g., Verilog, Hardware Description Language (HDL) code, etc.) stored on a computer usable medium. The code comprises data representations of the circuitry and components described herein that can be used to generate appropriate mask works for use in well known manufacturing systems to fabricate integrated circuits embodying aspects of the invention.

Although the described exemplary embodiments disclosed herein are directed to various examples of embodiments of systems and methods for implementing a fast decoder in data processing circuit buffers, the present invention is not necessarily limited to the example embodiments. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An apparatus for processing data in a buffer circuit comprising:
    a clock generator operable to generate a clock signal having an active phase and an inactive phase;
    a set of monotonic flip-flops operable to capture a set of incoming data addresses during said active cycle of said clock and to generate therefrom data corresponding to single bits in said addresses that have changed compared to the data addresses received by said set of monotonic flip-flops during an immediately preceding data capture cycle;
    a set of static flip-flops operable to capture a set of incoming data addresses during said inactive phase of said clock cycle and to generate a set of output data therefrom;
    a decoder operable to process said set of output data from said set of static flip-flops and to generate a set of old wordlines corresponding to a set of data addresses in said immediately preceding data capture cycle; and
    combinational logic operable to receive said set of single changed bits and said set of old wordlines and to generate therefrom a set of new wordlines.

2. The apparatus of claim 1, wherein said combinational logic comprises a plurality of two-input NAND circuits.

3. The apparatus of claim 1, wherein said buffer comprises a first-in-first-out (FIFO) buffer decoder.

4. The apparatus of claim 1, wherein said buffer comprises a full-cycle buffer.

5. The apparatus of claim 4, further comprising a frequency divider operable to divide said clock signal by a factor of two.

6. The apparatus of claim 1, wherein said buffer comprises a last-in-first-out (LIFO) buffer.

7. The apparatus of claim 6, said LIFO buffer further comprising first, second, and third two-input terminal AND gates, wherein each of said two-input AND gates receives data corresponding to the address of an old wordline on one of said input terminals and wherein on the other input terminal:
    said first AND gate receives input data corresponding to a single input bit that is changing for a wordline address that is incrementing;
    said second AND gate receives input data corresponding to a single input bit that is changing for a wordline address that is decrementing; and
    said third AND gate receives input data corresponding to any bit of an old wordline address.

8. The apparatus of claim 7, wherein said LIFO buffer further comprises a three-input multiplexer operable to selectively receive output data from said first, second, and third AND gates and to generate new wordline data therefrom.

9. The apparatus of claim 8, wherein said FIFO buffer further comprises a finite state machine operable to receive Read and Write enable signals and to use said READ and WRITE enable signals to generate a control signal to control generation of said new wordline data by said multiplexer, wherein said control signal is correlated with previous the wordline address history of said FIFO buffer.

10. The apparatus of claim 1, wherein said incoming data addresses are coded using Gray coding.

11. A method for processing data in a buffer circuit comprising:
    using a set of monotonic flip-flops to capture a set of incoming data addresses during an active phase of a clock signal and to generate therefrom data corresponding to single bits in said addresses that have changed compared to the data addresses received by said set of monotonic flip-flops during an immediately preceding data capture cycle;
    using a set of static flip-flops to capture a set of incoming data addresses during an inactive phase of the clock signal and to generate a set of output data therefrom;
    using a decoder to process said set of output data from said set of static flip-flops and to generate a set of old wordlines corresponding to a set of data addresses in said immediately preceding data capture cycle; and
    using combinational logic to receive said set of single changed bits and said set of old wordlines and to generate therefrom a set of new wordlines.

12. The method of claim 11, wherein said combinational logic comprises a plurality of two-input NAND circuits.

13. The method of claim 11, wherein said buffer comprises a first-in-first-out (FIFO) buffer decoder.

14. The method of claim 11, wherein said buffer comprises a full-cycle buffer.

15. The method of claim 14, further comprising: using a frequency divider operable to divide said clock signal by a factor of two.

16. The method of claim 11, wherein said buffer comprises a last-in-first-out (LIFO) buffer.

17. The method of claim 16, wherein said LIFO buffer further comprises first, second, and third two-input terminal AND gates, wherein each of said two-input AND gates receives data corresponding to the address of an old wordline on one of said input terminals and wherein on the other input terminal:
    said first AND gate receives input data corresponding to a single input bit that is changing for a wordline address that is incrementing;
    said second AND gate receives input data corresponding to a single input bit that is changing for a wordline address that is decrementing; and
    said third AND gate receives input data corresponding to any bit of an old wordline address.

18. The method of claim 17, wherein said LIFO buffer further comprises a three-input multiplexer operable to selectively receive output data from said first, second, and third AND gates and to generate new wordline data therefrom.

19. The method of claim 18, wherein said FIFO buffer further comprises a finite state machine operable to receive Read and Write enable signals and to use said READ and WRITE enable signals to generate a control signal to control generation of said new wordline data by said multiplexer, wherein said control signal is correlated with previous the wordline address history of said FIFO buffer.

20. The method of claim 11, wherein said incoming data addresses are coded using Gray coding.

21. A non-transitory computer readable medium comprising code stored therein, said code being executable by a processor to fabricate a buffer circuit, said buffer circuit comprising:
    a set of monotonic flip-flops operable to capture a set of incoming data addresses during an active phase of a clock signal and to generate therefrom data corresponding to single bits in said addresses that have changed compared to the data addresses received by said set of monotonic flip-flops during an immediately preceding data capture cycle;
    a set of static flip-flops operable to capture a set of incoming data addresses during an inactive phase of the clock signal and to generate a set of output data therefrom;
    a decoder operable to process said set of output data from said set of static flip-flops and to generate a set of old wordlines corresponding to a set of data addresses in said immediately preceding data capture cycle; and combinational logic operable to receive said set of single changed bits and said set of old wordlines and to generate therefrom a set of new wordlines.

22. The computer readable medium of claim 21, wherein said combinational logic comprises a plurality of two-input NAND circuits.

23. The computer readable medium of claim 21, wherein said buffer comprises a first-in-first-out (FIFO) buffer decoder.

24. The computer readable medium of claim 21, wherein said buffer comprises a full-cycle buffer.

25. The computer readable medium of claim 21, wherein said buffer comprises a last-in-first-out (LIFO) buffer.

* * * * *